United States Patent
Kamon et al.

(10) Patent No.: US 12,552,010 B2
(45) Date of Patent: Feb. 17, 2026

(54) MASTER-SLAVE SYSTEM AND CONTROLLING METHOD

(71) Applicant: Kawasaki Jukogyo Kabushiki Kaisha, Kobe (JP)

(72) Inventors: Masayuki Kamon, Kobe (JP); Hiroki Takahashi, Kobe (JP); Kai Shimizu, Kobe (JP); Yuki Takayama, Kobe (JP); Jun Fujimori, Kobe (JP); Hiroki Kinoshita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 280 days.

(21) Appl. No.: 17/784,120

(22) PCT Filed: Dec. 8, 2020

(86) PCT No.: PCT/JP2020/045599
§ 371 (c)(1),
(2) Date: Jun. 10, 2022

(87) PCT Pub. No.: WO2021/117701
PCT Pub. Date: Jun. 17, 2021

(65) Prior Publication Data
US 2023/0038804 A1    Feb. 9, 2023

(30) Foreign Application Priority Data

Dec. 13, 2019  (JP) ................................ 2019-225696

(51) Int. Cl.
*B25J 3/04* (2006.01)
*B25J 13/02* (2006.01)
*A61B 34/37* (2016.01)

(52) U.S. Cl.
CPC ................. *B25J 3/04* (2013.01); *B25J 13/02* (2013.01); *A61B 34/37* (2016.02)

(58) Field of Classification Search
CPC . B25J 3/04; B25J 13/025; B25J 9/1689; B25J 11/0065; B25J 13/02; B25J 13/085;
(Continued)

(56) References Cited

U.S. PATENT DOCUMENTS

| 2015/0293596 A1* | 10/2015 | Krausen ................ A61B 34/37 606/130 |
| 2016/0100899 A1 | 4/2016 | Jinno et al. |

(Continued)

FOREIGN PATENT DOCUMENTS

| CN | 101160104 A | 4/2008 |
| JP | 1-183379 A | 7/1989 |

(Continued)

*Primary Examiner* — Stephen Holwerda
(74) *Attorney, Agent, or Firm* — XSENSUS LLP

(57) ABSTRACT

A master-slave system includes: a master unit including an operation end, an operation detector that detects operational information inputted by a force being applied to the operation end, and a force applier that gives a force to the operation end; a slave unit including an action part, and an operation part that moves the action part; and a control device. The control device outputs, according to a regulating condition and the operational information, a command for causing the operation part to operate the action part to carry out operation reflecting the regulating condition. The control device outputs, according to the regulating condition, a command for causing the force applier to give a force to the operation end against the input to the operation end that commands the given movement of the action part.

20 Claims, 8 Drawing Sheets

(58) Field of Classification Search
CPC ........... G05B 2219/45058; G05B 2219/40183; G05B 2219/40144; A61B 34/37
See application file for complete search history.

(56) References Cited

U.S. PATENT DOCUMENTS

2017/0001301 A1* 1/2017 Kamiya ................. B25J 9/1633
2020/0214779 A1* 7/2020 Masuda ............... G05B 19/056

FOREIGN PATENT DOCUMENTS

| JP | 4-354680 A | 12/1992 | | |
|----|------------|---------|---|---|
| JP | 6-262548 A | 9/1994 | | |
| JP | 8-229858 A | 9/1996 | | |
| JP | 8-281573 A | 10/1996 | | |
| JP | 2017-13167 A | 1/2017 | | |
| WO | 2006091494 A1 | 8/2006 | | |
| WO | 2014/199414 A1 | 12/2014 | | |
| WO | WO-2019012812 A1 * | 1/2019 | ............. | A61B 34/37 |

* cited by examiner

MASTER-SLAVE SYSTEM AND CONTROLLING METHOD

CROSS-REFERENCE TO RELATED APPLICATION APPLICATIONS

This application is based on PCT filing PCT/JP2020/045599, filed on Dec. 8, 2020, and claims the priority of Japanese Patent Application No. 2019-225696 filed on Dec. 13, 2019 in Japan Patent Office, each of which is incorporated as a part of this application by reference in the entirety.

TECHNICAL FIELD

The present disclosure relates to a master-slave system and a controlling method.

BACKGROUND ART

Conventionally, robots have been used in order to substitute human acts. For example, Patent Document 1 discloses an articulated master-slave manipulator which restrains a tip-end operation of a slave arm within a work range limited beforehand. An operation control device of the master-slave manipulator described above carries out a restraining control for adding a restraining condition which sets a variation in an unnecessary direction to zero to variations of the position and the posture of a master arm so as to restrain the movement of the slave arm. In detail, the operation control device determines a vector acquired by projecting a variation vector of the position and the posture 25 of the master arm on a vector of the restraining condition, as a variation vector of the position and the posture of the slave arm.

REFERENCE DOCUMENT(S) OF CONVENTIONAL ART

Patent Document

[Patent Document 1] JP1994-262548A

DESCRIPTION OF THE DISCLOSURE

In Patent Document 1, the slave arm operates corresponding to the variation of the position and the posture of the slave arm which are obtained by adding the restraining condition to the variation of the position and the posture of the master arm. Thus, a state of the position and the posture of the master arm may not become similar to the state of the position and the posture of the slave arm. In this case, a difference arises between a state of the slave arm which can be sensed by an operator from the state of the master arm, and an actual state of the slave arm, and therefore, the operator may not operate the slave arm as he/she is intended.

One purpose of the present disclosure is to provide a master-slave system and a controlling method, capable of regulating operation of a slave unit, while maintaining a state of the slave unit similar to a state of a master unit.

In order to achieve the purpose, a master-slave system according to one aspect of the present disclosure includes a master unit including an operation end, an operation detector that detects and outputs operational information that is information inputted by a force being applied to the operation end, and a force applier that gives a force to the operation end, a slave unit including an action part that applies an action to an object, and an operation part that moves the action part, and a control device. The control device includes a first commander that outputs, according to a regulating condition for regulating a given movement of the action part, and the operational information, a command for causing the operation part to operate the action part to carry out operation reflecting the regulating condition, and a second commander that outputs, according to the regulating condition, a command for causing the force applier to give a force to the operation end against the input to the operation end that commands the given movement of the action part.

According to the present disclosure, the operation of the slave unit can be regulated while maintaining a state of the slave unit similar to a state of the master unit.

MODES FOR CARRYING OUT THE DISCLOSURE

Figure 1:
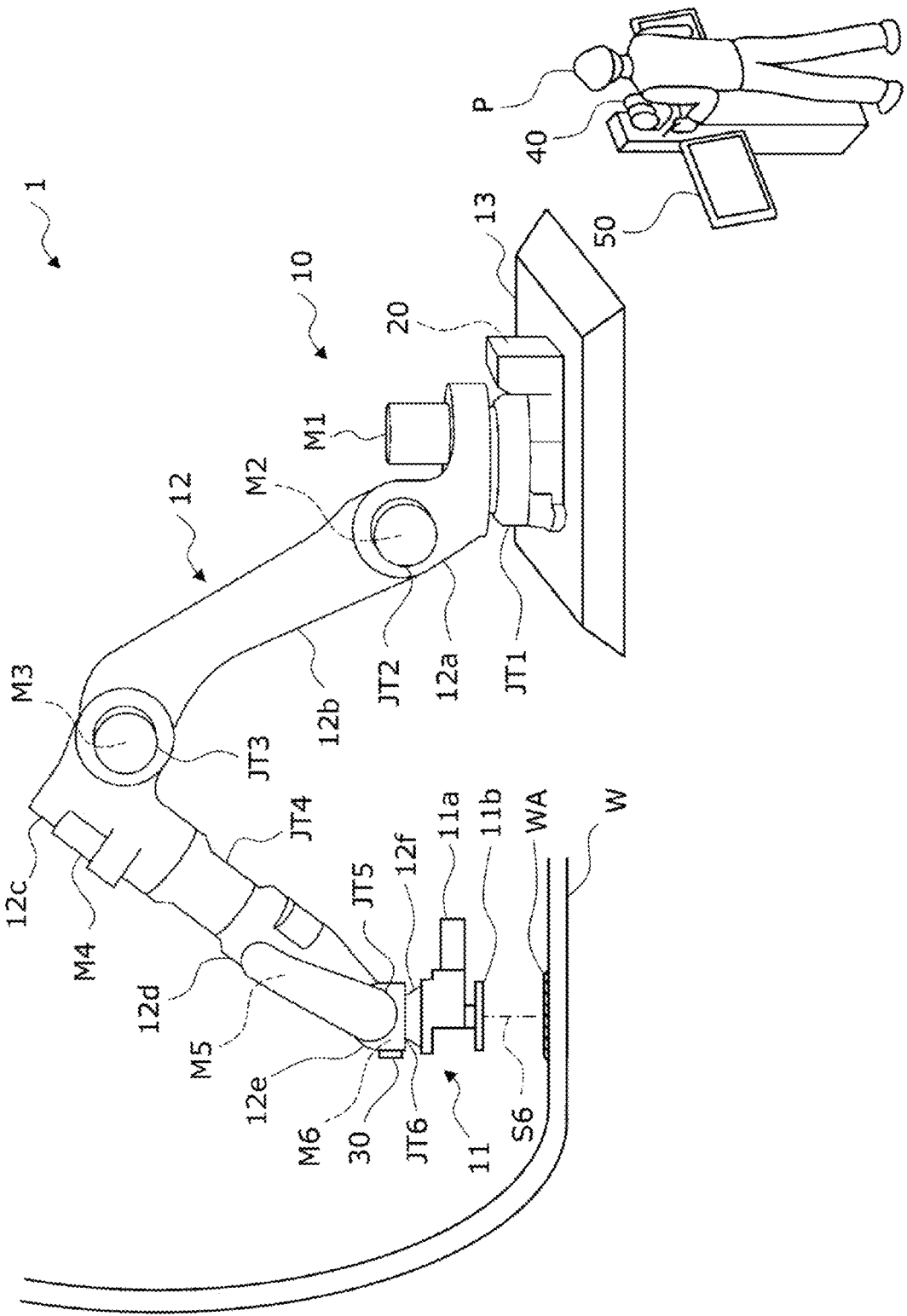
FIG. 1 is a schematic view illustrating one example of a robot system according to one embodiment.

First, one example of one aspect of the present disclosure is described. A master-slave system according to one aspect of the present disclosure includes a master unit including an operation end, an operation detector that detects and outputs operational information that is information inputted by a force being applied to the operation end, and a force applier that gives a force to the operation end, a slave unit including an action part that applies an action to an object, and an operation part that moves the action part, and a control device. The control device includes a first commander that outputs, according to a regulating condition for regulating a given movement of the action part, and the operational information, a command for causing the operation part to operate the action part to carry out operation reflecting the regulating condition, and a second commander that outputs, according to the regulating condition, a command for causing the force applier to give a force to the operation end against the input to the operation end that commands the given movement of the action part.

According to this aspect, the control device operates the action part according to the operational information while regulating the given movement of the action part according to the regulating condition. Further, the control device regulates the input to the operation end which commands the given movement of the action part by giving the force to the operation end. Therefore, the slave unit carries out the operation reflecting the regulating condition while maintaining a state of the master unit and a state of the slave unit to be the similar state. For example, the first and second commanders may output an operation command and a control command as the command.

In the master-slave system according to the aspect of the present disclosure, the slave unit may move a position and a posture of the action part by the operation part, and the operation end may be movable to change a position and a posture. The regulating condition may be a condition for regulating a movement of the posture of the action part, as the given movement. According to this aspect, the control device operates the action part while regulating the movement of the posture of the action part. Further, the control device regulates the movement of the posture of the operation end corresponding to the regulated movement of the posture of the action part. Therefore, the slave unit carries out the operation reflecting the regulating condition while maintaining the posture of the master unit and the posture of the slave unit to be the similar posture.

In the master-slave system according to the aspect of the present disclosure, the operation detector may detect a direction and a magnitude of the force applied to the operation end, as the operational information. According to this aspect, the command of the direction and the magnitude of the force applied to the operation end may be converted into the command of a moving direction of the action part, a moving speed, and a force applied in the moving direction. Therefore, an operator can control the operation of the action part by applying the force to the operation end.

In the master-slave system according to the aspect of the present disclosure, the operation detector may detect magnitudes of forces in directions of three axes and moments of the forces about the three axes, that are applied to the operation end, as the operational information. According to this aspect, the command of the magnitudes of forces in the three axial directions applied to the operation end may be converted into the command of moving speeds and action forces of the action part in the three axial directions. The command of the moments of forces about the three axes applied to the operation end may be converted into the command of rotational speeds and rotational forces of the action part on the three axes. Therefore, the operator can control the position and the posture of the action part by applying the force to the operation end.

In the master-slave system according to the aspect of the present disclosure, the regulating condition may be a condition for regulating a movement of the posture of the action part corresponding to the moments of the forces about the three axes of the operational information, as the given movement. According to this aspect, the control device regulates the moments of the forces about the three axes included in the operational information according to the regulating condition, and outputs the command using the regulated operational information, and thus, it can cause the slave unit to carry out the operation reflecting the movement regulation of the posture of the action part.

In the master-slave system according to the aspect of the present disclosure, the action part may include a grinding device, and the operation part may include a robotic arm. According to this aspect, in a grinding work, a posture of a grindstone of the grinding device is preferably in a given posture with respect to a grinding target object. The control device can control the posture of the grindstone freely using the robotic arm to be the given posture.

In the master-slave system according to the aspect of the present disclosure, the control device may further include an accepting part that accepts a transition command for changing a posture of the action part to a given posture. When the accepting part accepts the transition command, the first commander may output a command for changing the posture of the action part into the given posture. According to this aspect, the control device changes the posture of the action part into the given posture according to the transition command. For example, the given posture may be a preferable posture of the action part or a basic posture. Thus, the transition of the posture of the action part as described above can be carried out easily without the operation using the operation end.

In the master-slave system according to the aspect of the present disclosure, the force applier may be connected to the operation end to move the operation end by the force given by the force applier. When the accepting part accepts the transition command, the second commander may further output a command for causing the force applier to give, to the operation end, a force that changes the posture of the operation end into a posture corresponding to the given posture. According to this aspect, the control device changes the posture of the action part into the given posture and changes the posture of the operation end into the posture corresponding to the given posture of the action part, according to the transition command. Therefore, the postures of the action part and the operation end can correspond to each other while both of them can be made into target postures.

In the master-slave system according to the aspect of the present disclosure, the slave unit may further include a force detector that detects a force received by the action part from the object. When the force detector detects the force during a transition of the action part to the given posture, the first commander may output a command for moving the position of the action part and changing the posture of the action part into the given posture. According to this aspect, when the force is detected by the force detector because a contact or collision occurs during the transition of the posture of the action part, the control device can move the position of the action part and change the posture of the action part into the given posture, for example, so as to avoid such a contact or collision. Therefore, the transition of the posture can be possible surely. Note that, after the detection of the force, the control device may perform the movement of the position of the action part and the transition of the posture of the action part in parallel, and alternatively, the control device may suspend the transition of the posture of the action part once and, after the movement of the position of the action part, perform the transition of the posture of the action part. In the latter case, the control device may start the transition of the posture of the action part after the movement of the position of the action part is completed, and alternatively, the control device may start the transition of the posture of the action part during the movement of the position of the action part to perform the movement of the position and the transition of the posture of the action part in parallel.

A controlling method according to another aspect of the present disclosure is a method of controlling a slave unit manipulated by a master unit. The method includes the step of outputting, according to operational information that is information inputted by a force being applied to an operation end of the master unit, and a regulating condition for regulating a given movement of an action part of the slave unit that applies an action to an object, a command for causing an operation part of the slave unit to operate the action part to carry out operation reflecting the regulating condition. The method includes the step of outputting, according to the regulating condition, a command for causing the master unit to generate a force to the operation end against an input to the operation end that commands the given movement of the action part. According to this aspect, similar effects to the master-slave system according to the one aspect of the present disclosure are achieved.

Embodiment

Hereinafter, one embodiment of the present disclosure is described with reference to the drawings. Note that this embodiment which will be described below illustrates a comprehensive or concrete example. Further, components which are not described in the independent claims indicating the top concept among components in the following embodiment are described as arbitrary components. Each figure in the accompanying drawings is a schematic figure, and is not necessarily illustrated exactly. In each drawing, the same reference characters are assigned to substantially the same components, and therefore, redundant explanation may be omitted or simplified. The term "device" (apparatus) as used in this specification and the claims may not only mean a sole device (apparatus), but may also mean a system comprised of a plurality of devices (a plurality of apparatuses).

[Configuration of Robot System]

A configuration of a robot system 1 according to this embodiment is described. FIG. 1 is a schematic view illustrating one example of the robot system 1 according to this embodiment. As illustrated in FIG. 1, the robot system 1 according to this embodiment includes a robot 10, a control device 20, an imaging device 30, an operation input device 40, and a presentation device 50. The robot system 1 constitutes a master-slave system, where the robot 10 constitutes a slave unit, and the operation input device 40 constitutes a master unit. The control device 20 controls entire operation of the robot system 1. The control device 20 performs a bilateral control between the robot 10 and the operation input device 40.

In this embodiment, the robot 10 is an industrial robot. Although the robot 10 is fixedly disposed on a pedestal 13, it may be disposed on a movable device, such as a conveying device, so that it is movable. The robot 10 includes an end effector 11, as an action part, which applies an action to an object to be processed, and a robotic arm 12, as an operation part, which moves the end effector 11 to perform the action. In this embodiment, the following explanation is given as the end effector 11 applying the action, such as grinding, to the object. Such an end effector 11 includes a grinding device 11a which grinds the object, and it is attached to a tip end of the robotic arm 12. Note that the action of the end effector 11 is not limited to grinding, but may be any kind of action. For example, the action of the end effector 11 may be an action in which a posture of the end effector 11 desirable to the object to be acted exists.

In this specification and the claims, "grinding" may include cutting which is machining for making the object into a required size, shape, etc. by removing unnecessary parts of the object, grinding which is machining for making the object into a required size, shape, surface roughness, etc. by shaving off the surface of the object, and polishing which is machining for smoothening the surface of the object.

Although the example of the grinding device 11a includes grinding devices which use electric power or air pressure as a power source, such as a grinder, an orbital sander, a random orbit sander, a delta sander, and a belt sander, it is not limited to these. The grinder may be a grinder which rotates a disk-shape grindstone, a grinder which rotates a cone- or pillar-shaped grindstone, etc.

In this embodiment, the following explanation is given such that the "grinding" is machining in which an unnecessary part in a grinding target area WA of a metal object W is shaved off to smoothen the surface of the grinding target area WA, and the grinding device 11a is an electric disk grinder including a disk-like grindstone 11b. The example of the unnecessary part in the grinding target area WA includes a welding mark, such as welding beads of the object W. The grinding device 11a grinds the welding mark and its vicinity by pressing the rotating grindstone 11b against the welding mark etc. in the grinding target area WA. The object W illustrated in FIG. 1 is a wall of a large-sized tank.

If the robotic arm 12 is changeable in the position and/or the posture of the grinding device 11a at a tip end thereof, the robotic arm 12 is, but not limited in particular to, a vertical articulated robotic arm in this embodiment. Note that the robotic arm 12 may be constituted as a robotic arm of a horizontal articulated type, a polar coordinate type, a cylindrical coordinate type, a Cartesian coordinate type, or other types.

The robotic arm 12 is fixed to the pedestal 13. The robotic arm 12 includes links 12a, 12b, 12c, 12d, and 12f which are serially disposed from its base part to its tip end, joints JT1, JT2, JT3, JT4, JT5, and JT6 which sequentially and pivotably connect the links 12a, 12b, 12c, 12d, and 12f, and arm drives M1, M2, M3, M4, M5, and M6 which rotate the respective joints JT1, JT2, JT3, JT4, JT5, and JT6. The link 12a is attached to the pedestal 13 via the joint JT1. A tip-end part of the link 12f constitutes a mechanical interface, which is connected to the end effector 11. The operations of the arm drives M1, M2, M3, M4, M5, and M6 are controlled by the control device 20. Although each of the arm drives M1, M2, M3, M4, M5, and M6 uses electric power as a power source, and has a servomotor Ma (see FIG. 6) as an electric motor which drives the arm drive, it is not limited to this configuration. Note that the number of joints of the robotic arm 12 is not limited to six, but it may be seven or more, or five or less.

Figure 2:
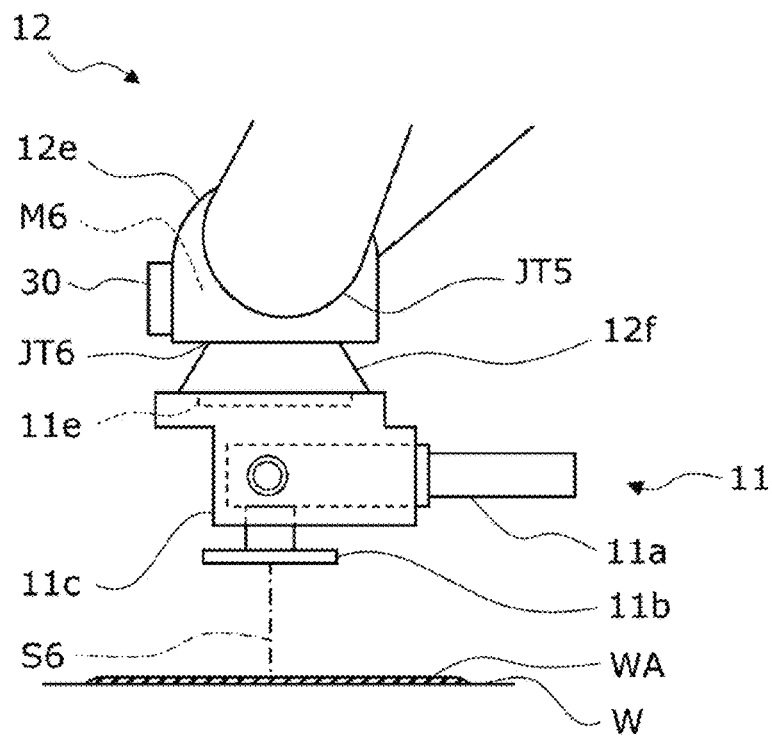
FIG. 2 is a side view illustrating one example of a configuration of an end effector according to this embodiment.
Figure 3:
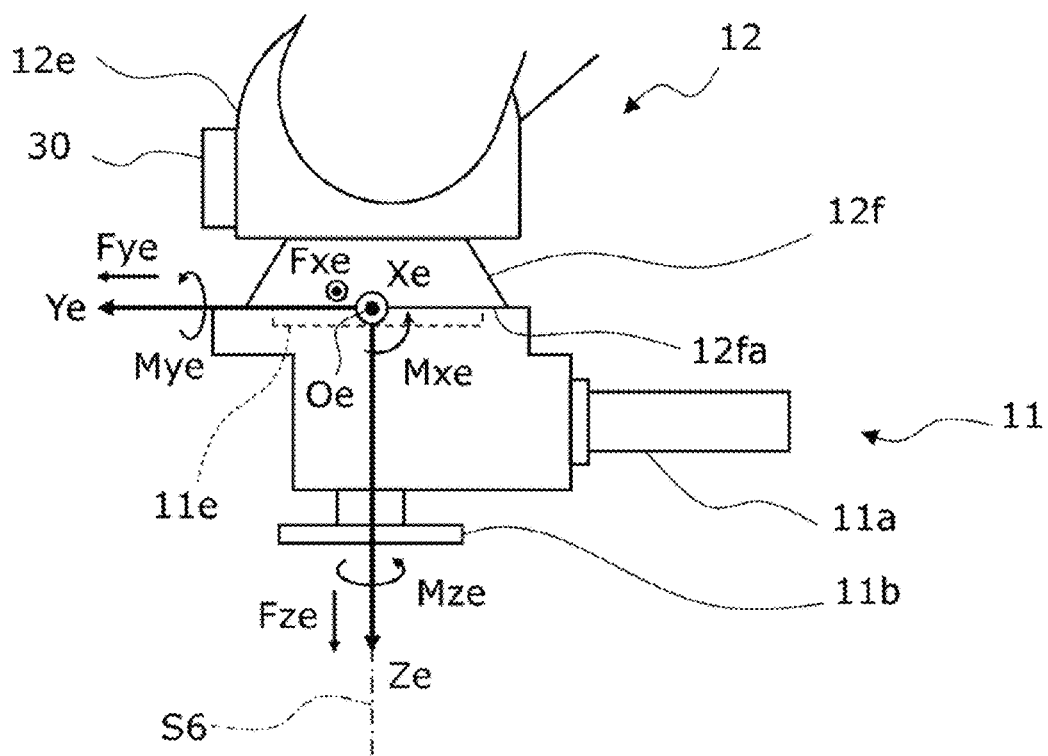
FIG. 3 is a side view illustrating one example of a detection axis of a force sensor of the end effector of FIG. 2.

FIG. 2 is a side view illustrating one example of a configuration of the end effector 11 according to this embodiment. FIG. 3 is a side view illustrating one example of a detection axis of a force sensor 11e of the end effector 11 of FIG. 2. As illustrated in FIG. 2, the end effector 11 includes the grinding device 11a, the grindstone 11b, a fixture 11c, and the force sensor 11e. The fixture 11c supports the grinding device 11a, and it is connected to the link 12f so that the grinding device 11a is attached to the link 12f. The force sensor 11e is disposed between the fixture 11c and the link 12f. The force sensor 11e detects a reaction force which is a force acting on the link 12f from the fixture 11c, and outputs it to the control device 20. The reaction force is a force which the grinding device 11a receives from the object W during a grinding work. The force sensor 11e is one example of a force detector.

As illustrated in FIG. 3, in this embodiment, the force sensor 11e detects forces of six axes comprised of axial forces Fxe, Fye and Fze of Xe-axis, Ye-axis, and Ze-axis which are perpendicular to each other, and moments Mxe, Mye, and Mze which are rotational forces about the Xe-axis, the Ye-axis, and the Ze-axis, respectively. The Ze-axis is the same axis as a twist axis S6 of the link 12f, and the Ze-axis positive direction is a direction from the link 12f toward the end effector 11. An intersection between an interface surface 12fa which constitutes a mechanical interface of the link 12f and the Ze-axis is an origin Oe. The Xe-axis and the Ye-axis are axes extending along the interface surface 12fa. Note that the force sensor 11e is not limited to the sensor which detects the forces of the six axes as described above, but, for example, it may be a sensor which detects some of the forces of the six axes.

As illustrated in FIGS. 1 and 2, the imaging device 30 is disposed at a link 12e of the robotic arm 12. The imaging device 30 may include a camera (not illustrated), and may be further include a light source, such as an LED (light emitting diode) for illuminating a photographic subject, and a stroboscope. The camera of the imaging device 30 may be oriented in a direction along the axial direction of the twist axis S6 and toward the end effector 11 so that it images the grinding target area WA and its vicinity. Note that the position of the imaging device 30 may be any position as long as the grinding target area WA can be imaged, and it may be a position on the robotic arm 12 other than the link 12e, or a position exterior of the robotic arm 12. The imaging device 30 causes the camera to carry out an imaging operation in accordance with a command of the control device 20. The imaging device 30 sends a signal etc. of the image captured by the camera to the control device 20. Note that, in the following explanation, "imaging by the camera" may be expressed as "imaging (capturing) by the imaging device 30."

The camera of the imaging device 30 captures an image for detecting a three-dimensional position which is a position of a photographic subject in a three-dimensional space with respect to the imaging device 30, such as a distance to the photographic subject. For example, the camera captures a digital image, which may be a stereo camera, a monocular camera, a TOF camera (Time-of-Flight-Camera), a pattern light projection camera of striped projection etc., or a camera using a light-section method. In this embodiment, the camera of the imaging device 30 is the stereo camera.

Figure 4:
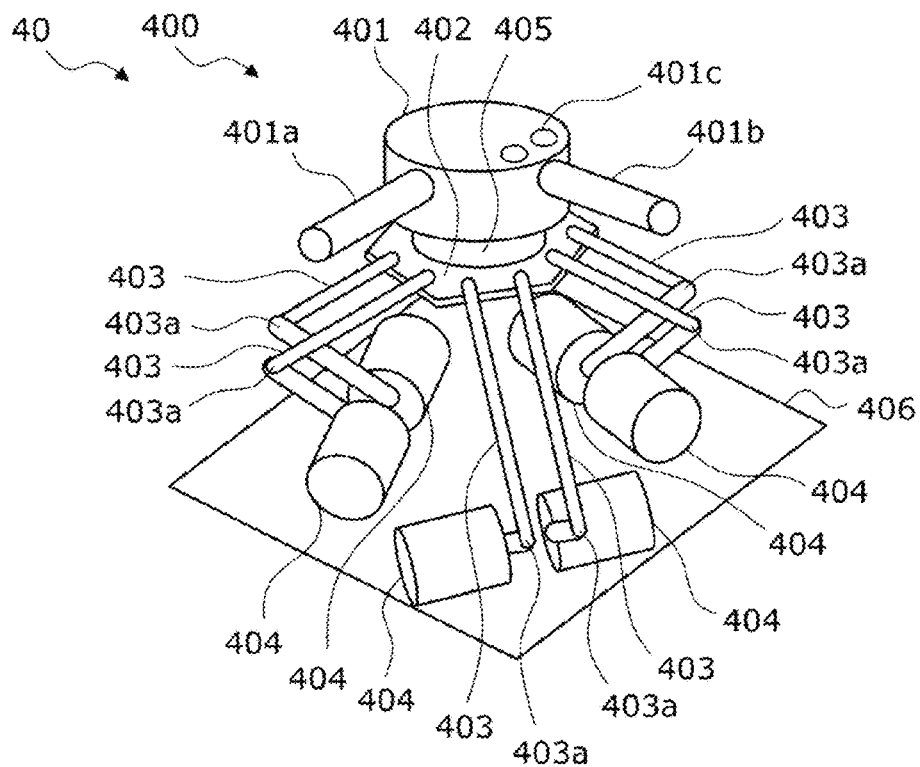
FIG. 4 is a perspective view illustrating one example of a configuration of a user interface of an operation input device according to one embodiment.
Figure 5:
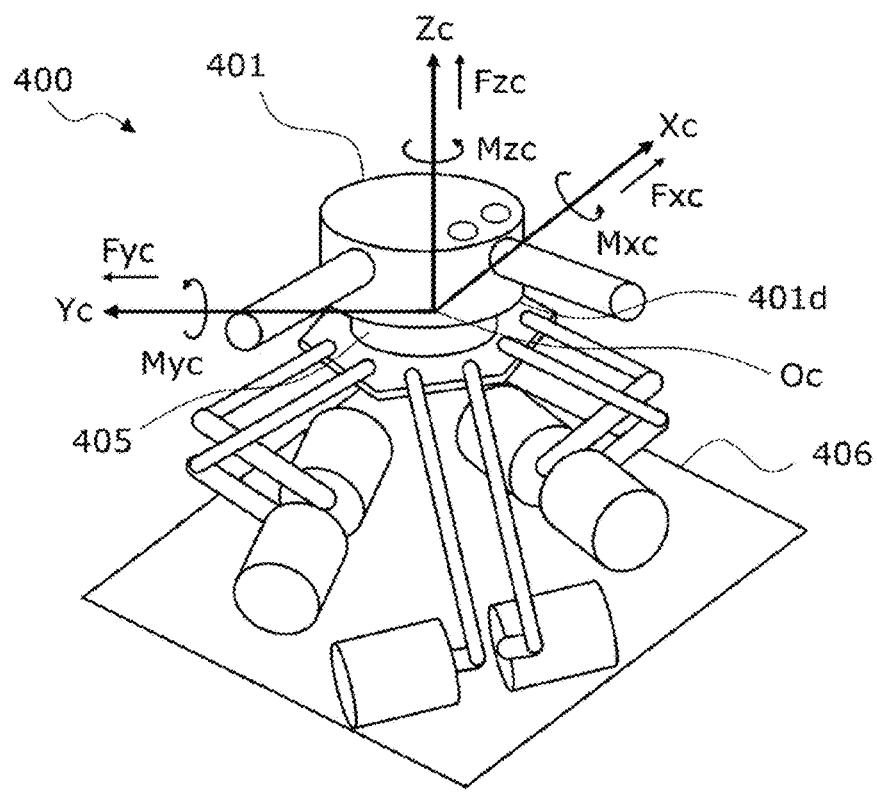
FIG. 5 is a perspective view illustrating one example of a detection axis of a force sensor of the user interface of FIG. 4.
Figure 6:
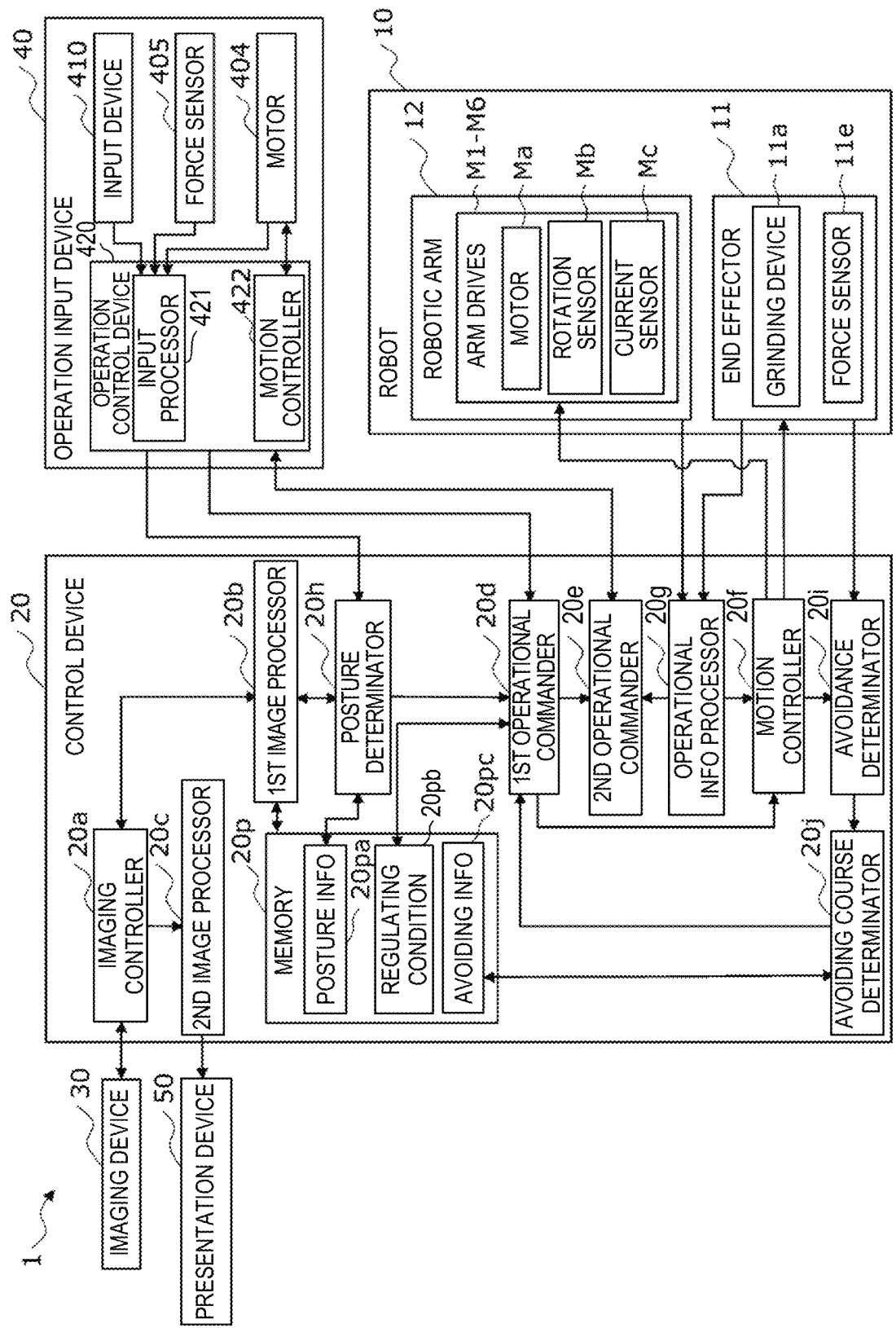
FIG. 6 is a block diagram illustrating one example of a functional configuration of the robot system according to this embodiment.

FIG. 4 is a perspective view illustrating one example of a configuration of a user interface 400 of the operation input device 40 according to this embodiment. FIG. 5 is a perspective view illustrating one example of a detection axis of a force sensor 405 of the user interface 400 of FIG. 4. FIG. 6 is a block diagram illustrating one example of a functional configuration of the robot system 1 according to this embodiment. As illustrated in FIGS. 1, 4, and 6, the operation input device 40 is disposed away from the robot 10, accepts an input, such as a command, data, and information, by a user P who manages and/or operates the robot system 1, and outputs the command, data, information, etc. to the control device 20. The operation input device 40 is connected with the control device 20 wiredly or wirelessly. The wired and wireless communications may be any kind of forms.

The operation input device 40 includes the user interface 400, an input device 410, and an operation control device 420. The operation control device 420 controls entire operation of the operation input device 40, and communicates the information, command, data, etc. with the control device 20. The user interface 400 accepts an input for manually operating the robot 10, and outputs to the operation control device 420 operational information which is the inputted information. The user interface 400 gives, by a control of the operation control device 420, a reaction force against an operating force etc., to the user P who operates the user interface 400.

The input device 410 accepts the input of the information, command, data, etc., and outputs it to the operation control device 420. For example, the input device 410 may include a known input device, such as a lever, a button, a key, a touch panel, a joystick, and a motion capture. The input device 410 accepts inputs, such as operation of the imaging device 30, various commands such as a command for changing the end effector 11 into a given posture, switching of the control mode, information on the object to be ground, and information on a grinding target area. The given posture of the end effector 11 may be a given posture of the end effector 11 with respect to the surface of the grinding target area. The posture of the end effector 11 with respect to the surface of the grinding target area is a posture of the grindstone 11b with respect to the surface of the grinding target area. The information on the grinding target area may include information, such as the quantity, the position, the posture, the shape, the size, etc. of the grinding target area.

As illustrated in FIG. 4, the user interface 400 includes a gripper 401, a support 402, arms 403, motors 404, and the force sensor 405. The gripper 401 is grippable by the user P. In this embodiment, although the gripper 401 has the same shape as the grinder which is the grinding device 11a, it is not limited to this configuration. The gripper 401 includes two handles 401a and 401b where the user P can grip. The user P grips the handles 401a and 401b like he/she grips the grinding device 11a and actually performs grinding, and moves the gripper 401 to operate the robot 10 so that the robot 10 performs a grinding operation. The gripper 401 includes an input part 401c, such as a push button, for operating the grinding device 11a. The gripper 401 is one example of an operation end.

The support 402 supports the gripper 401. The support 402 is movably supported by the six arms 403. The six arms 403 are comprised of three pairs. The three pairs of arms 403 extend radiately in three directions from the support 402. Each arm 403 has a joint 403a, and is bendable centering on the joint 403a. One end of each arm 403 is connected with the support 402 via a universal joint, such as a ball joint, so as to be rotatable on the three axes perpendicular to each other. The other end of each arm 403 is connected, via a reduction gear (not illustrated) etc., with the rotation shaft of the motor 404 disposed on a support table 406 below the support 402. The joint 403a of each arm 403 connects two columnar members which constitute the arm 403, via a universal joint, such as a ball joint, so as to be rotatable on the three axes perpendicular to each other.

The six motors 404 are disposed on the support table 406. The six motors 404 are comprised of three pairs. Each pair of motors 404 are disposed so that their rotation axes become coaxial, and are connected to one pair of arms 403. The three pairs of motors 404 are disposed so that their rotation axes constitute respective triangular sides. Each motor 404 is comprised of a servomotor etc.

The gripper 401 described above can take various positions and postures in the three-dimensional space. Corresponding to the position and the posture of the gripper 401, the arms 403 operate to rotate the respective motors 404. The rotating amounts of the six motors 404 corresponding to the position and the posture of the gripper 401 (i.e., a rotation angle) can be defined uniquely.

The force sensor 405 is disposed between the gripper 401 and the support portion 402, and detects a force acting therebetween. As illustrated in FIG. 5, in this embodiment, the force sensor 405 detects forces of six axes comprised of axial forces Fxc, Fyc and Fzc of Xc-axis, Yc-axis, and Zc-axis which are perpendicular to each other, and moments Mxc, Myc, and Mzc which are rotational forces about the Xc-axis, the Yc-axis, and the Zc-axis, respectively.

The Zc-axis is an axis which passes through the center of a circular contact surface 401d of the gripper 401 with the force sensor 405, and is perpendicular to the contact surface 401d. The Zc-axis positive direction is a direction from the force sensor 405 toward the gripper 401. An intersection between the contact surface 401d and the Zc-axis is an origin Oc. The Xc-axis and the Yc-axis are axes extending along the contact surface 401d. Although not limited to this configuration, in this embodiment, the Xc-axis, the Yc-axis, and the Zc-axis are associated with the Xe-axis, the Ye-axis, and the Ze-axis of the force sensor 11e of the end effector 11, respectively. For example, the Xc-axis positive direction may correspond to the Xe-axis negative direction, the Yc-axis positive direction may correspond to the Ye-axis positive direction, and the Zc-axis positive direction may correspond to the Ze-axis negative direction, or the Xc-axis positive direction may correspond to the Xe-axis positive direction, the Yc-axis positive direction may correspond to the Ye-axis positive direction, and the Zc-axis positive direction may correspond to the Ze-axis positive direction. Note that the force sensor 405 is not limited to the sensor which detects the forces of the six axes described above, but, for example, it may be a sensor which detects some of the forces of the six axes. The force sensor 405 is one example of an operation detector, and the motor 404 is one example of a force applier.

In this embodiment, the control device 20 performs a force orientation control by a bilateral method so that the position, the posture, and the force state correspond between the user interface 400 and the robot 10. Although not limited to this configuration, each motor 404 includes a rotation sensor (not illustrated), such as an encoder, which detects a rotation amount of a rotator of the servomotor, and a current sensor (not illustrated) which detects driving current of the servomotor. The operation control device 420 outputs to the control device 20 the operational information including detection signals of the forces of the six axes of the force sensor 405 (hereinafter, may also be referred to as the "force signal"), as a manipulation command for instructing the position, the posture, and a moving speed and the force of the position and the posture. etc. The control device 20 uses the detection signals of the rotation sensor and the current sensor of each motor 404 (hereinafter, may also be referred to as the "rotation signal" and the "current signal") as feedback information for causing the motor 404 to generate the force to be given to the gripper 401. Note that the control device 20 may use the command value of the current supplied to the servomotor from a drive circuit of this servomotor, as feedback information. The manipulation command is one example of operational information.

The control device 20 generates an operational command (described later) using the manipulation command. The operational command includes commands for a three-dimensional position and posture of the end effector 11, the moving speed of the position and the posture, and a force applied to the end effector 11, according to the manipulation command. Further, the control device 20 controls an output torque of each motor 404 based on force data of the six axes indicated by the detection signal of the force sensor 11e of the end effector 11, and the feedback information of the user interface 400. That is, the control device 20 servo-controls the six motors 404. The control device 20 controls the output torque of each motor 404 to generate a force to be given to the gripper 401. For example, the force described above is a reaction force corresponding to the force data of the force sensor 11e to the operating force of the gripper 401 by the user P, and a force for regulating a movement of the position and/or the posture of the gripper 401 with respect to the operating force.

The configuration of the user interface 400 is not limited to the configuration of FIG. 4, but, for example, it may be a configuration capable of limiting the movement of the part which is operated by the user P. For example, the configuration of the user interface 400 may be a configuration for limiting the movement of the operated part by giving a force to this part, or may be a configuration for mechanically limiting the movement of the part. For example, the user interface 400 may be comprised of a master robot similar to the robotic arm 12 so that the robot 10 is controlled as a slave robot. Alternatively, the user interface 400 may be a joystick etc.

Further, although the configuration of the user interface 400 is the configuration which detects the operational information corresponding to a force applied to the gripper 401 by the user P, when the force is applied, but it is not limited to this configuration. For example, in the user interface 400, the moving amounts of the position and the posture of the gripper 401 which is moved by a force being applied may be detected as the operational information. The moving amount may be detected based on the rotation amount of each motor 404. Further, the force applied to the gripper 401 may be detected based on load of each motor 404 as the operational information.

The presentation device 50 presents to the user P of the robot system 1 an image, sound, etc. for operating the robot system 1 which is received from the control device 20. Although the example of the presentation device 50 includes a liquid crystal display, and an organic or inorganic EL (Electro Luminescence) display, it is not limited to these displays. The presentation device 50 may include a speaker which outputs sound. For example, the presentation device 50 presents to the user P who operates the operation input device 40 the image captured by the imaging device 30.

[Hardware Configuration of Control Device]

Figure 7:
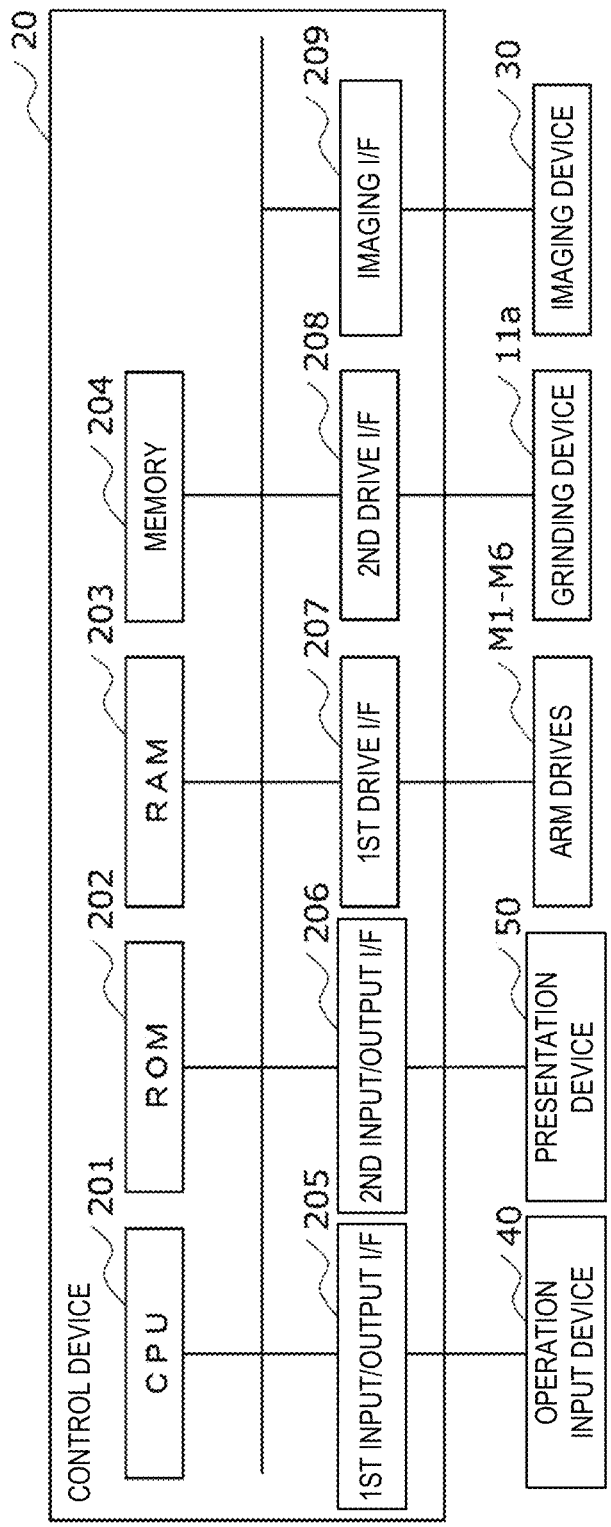
FIG. 7 is a block diagram illustrating one example of a hardware configuration of a control device according to this embodiment.

A hardware configuration of the control device 20 is described. FIG. 7 is a block diagram illustrating one example of the hardware configuration of the control device 20 according to this embodiment. As illustrated in FIG. 7, the control device 20 includes a CPU (Central Processing Unit) 201, a ROM (Read Only Memory) 202, a RAM (Random Access Memory) 203, a memory 204, input/output I/Fs (interfaces) 205 and 206, drive I/Fs 207 and 208, and an imaging I/F 209, as components. The components described above are connected with each other via a bus, wiredly, or wirelessly. Not all the components described above are essential.

For example, the CPU 201 is a processor, which controls entire operation of the control device 20. The ROM 202 is comprised of a nonvolatile semiconductor memory, which stores a program, data, etc. for causing the CPU 201 to control the operation. The RAM 203 is comprised of a volatile semiconductor memory, which temporarily stores the program to be executed by the CPU 201, and processing or processed data. The memory 204 is comprised of a storage device, such as a semiconductor memory such as a volatile memory and a nonvolatile memory, a hard disk drive (HDD), and an SSD (Solid State Drive), which stores various information.

For example, the program for operating the CPU 201 is saved beforehand in the ROM 202 or the memory 204. The CPU 201 reads the program from the ROM 202 or the memory 204, and develops it to the RAM 203. The CPU 201 executes each coded command in the program developed in the RAM 203.

Each function of the control device 20 may be realized by a computer system comprised of the CPU 201, the ROM 202, and the RAM 203, or may be realized by hardware circuitry for exclusive use, such as an electronic circuit or an integrated circuit, or may be realized by a combination of the computer system and the hardware circuitry.

Such a control device 20 may be comprised of, for example, a microcontroller, an MPU (Micro Processing Unit), an LSI (Large Scale Integration), a system LSI, a PLC (Programmable Logic Controller), or a logical circuit. A plurality of functions of the control device 20 may be realized by respective chips, or may be realized by a single chip so as to include a part or all of the functions. Further, the circuitry may be general-purpose circuitry, or may be circuitry for exclusive use. As the LSI, an FPGA (Field Programmable Gate Array) which is programmable after the LSI production, a reconfigurable processor which is reconfigurable and/or the setup of circuit cells inside the LSI, or an ASIC (Application Specific Integrated Circuit) by which circuits for a plurality of functions are assembled in one circuit for the particular application, may be used.

The imaging I/F 209 controls the drive of an image sensor (not illustrated) of a camera of the imaging device 30 according to a command of the CPU 201. The imaging I/F 209 takes into the RAM 203 or the memory 204 a signal of the image captured by the imaging device 30. A circuit etc. for driving the imaging device 30 may be disposed between the imaging I/F 209 and the imaging device 30 inside or outside the control device 20.

The first input/output I/F 205 is connected to the operation input device 40, and communicates signals, such as information, data, and a command. A circuit etc. for converting and amplifying signals may be disposed between the first input/output I/F 205 and the operation input device 40, inside or outside of the control device 20.

The second input/output I/F 206 is connected to the presentation device 50, and communicates signals, such as image data, sound data, information, and a command. A circuit etc. for converting and amplifying a signal may be disposed between the second input/output I/F 206 and the presentation device 50, inside or outside of the control device 20.

The first drive I/F 207 is connected to the arm drives M1, M2, M3, M4, M5, and M6 of the robot 10, and communicates signals, such as information and a command. An arm drive circuit (not illustrated) is disposed between the first drive I/F 207 and the arm drives M1, M2, M3, M4, M5, and M6, inside or outside of the control device 20. The arm drive circuit supplies electric power to servomotors of the arm drives M1, M2, M3, M4, M5, and M6 according to the command of the CPU 201 to control the drive of each servomotor.

The second drive I/F 208 is connected to the grinding device 11a of the end effector 11, and communicates signals, such as information and a command. A grinding drive circuit (not illustrated) is disposed between the second drive I/F 208 and the grinding device 11a, inside or outside of the control device 20. The grinding drive circuit supplies electric power to the grinding device 11a according to the command of the CPU 201 to control the drive of the grinding device 11a.

[Functional Configuration of Robot System]

A functional configuration of the robot system 1 is described. As illustrated in FIG. 6, the operation control device 420 of the operation input device 40 includes an input processor 421 and a motion controller 422, as functional components. The control device 20 includes an imaging controller 20a, image processors 20b and 20c, operational commanders 20d and 20e, a motion controller 20f, an operational information processor 20g, a posture determinator 20h, an avoidance determinator 20i, an avoiding course determinator 20j, and a memory 20p, as functional components. Not all the functional components described above are essential.

The functions of the input processor 421 and the motion controller 422 of the operation control device 420 are realized by a computer system such as a CPU, hardware circuitry, or a combination of the computer system and the hardware circuitry. The functions of the functional components of the control device 20, except for the memory 20p, are realized by the CPU 201 etc., and the function of the memory 20p is realized by the memory 204, the ROM 202, and/or the RAM 203.

The input processor 421 of the operation control device 420 outputs to the control device 20 the information, data, command, etc. which are received from the input device 410, the force sensor 405, and the motor 404. For example, the input processor 421 accepts, from the input device 410, a command of the operation of the imaging device 30, a command of the transition to the given posture, a command of the switching of the control mode, information on the object to be ground, information on the grinding target area, etc.

The command of the operation of the imaging device 30 includes commands of a start, an end, a timing, etc. of the imaging. The command of the transition to the given posture is a command for changing the postures of the end effector 11 and the grinding device 11a to the posture set beforehand. The example of the given posture is a basic posture for grinding operation. The example of the command of the switching of the control mode is a command for switching the mode between a regulated mode in which at least a part of the movement of the end effector 11 and the gripper 401 of the user interface 400 is regulated, and a non-regulated mode in which the regulation described above does not effect.

The input processor 421 detects the detection values of the forces of the six axes from the force signals of the force sensor 405. The input processor 421 outputs to the control device 20 the detection values of the forces of the six axes, or processed values of the detection values of the forces of the six axes. For example, the input processor 421 processes the detection values of the forces of the six axes to generate the manipulation command to the end effector 11, and outputs it to the control device 20. The manipulation command includes a manipulational position command for instructing a change amount, a change direction, a rate of change in the position of the end effector 11, and a change amount, a change direction, and a rate of change in the posture of the end effector 11, and a manipulational force command for instructing a magnitude and a direction of the action force which the end effector 11 applies to the object.

The input processor 421 receives the detection signals of the rotation sensor and the current sensor from each motor 404, detects the rotation amount and the current value of the motor 404 based on the detection signals, and outputs them to the control device 20 as feedback information.

The motion controller 422 controls the drive of each motor 404. In detail, the motion controller 422 accepts an operational command including an operation driving command and/or an operation regulating command from the second operational commander 20e of the control device 20. The motion controller 422 makes each motor 404 generate torque, such as rotational load (may also be referred to as the "load torque"), according to the operational command described above. This rotational load acts as a force against the operating force which is given to the gripper 401 by the user P. The motion controller 422 controls the torque of each motor 404, using the rotation amount and the current value which are detected at each motor 404 as feedback information.

The operation driving command includes a command for giving to the gripper 401 a reaction force corresponding to the magnitude and the direction of the reaction force received by the end effector 11 from the object to be ground.

The magnitude and the direction of the reaction force correspond to the magnitude and the direction of the force which are detected by the force sensor 11e. Further, the operation driving command includes a command for giving to the gripper 401 a force for moving the gripper 401 so that the position and the posture of the gripper 401 correspond to the position and the posture of the end effector 11. The motion controller 422 generates a control command for making each motor 404 drive so as to give to the gripper 401 a force of the magnitude and the direction according to the operation driving command, and outputs it to the motor 404. Therefore, the user P operates the gripper 401, while sensing the reaction force from the gripper 401, for example, as if he/she receives the reaction force from the object. Further, the motor 404 moves the gripper 401 so that the position and the posture of the gripper 401 correspond to the position and the posture of the end effector 11.

The operation regulating command is a command for giving to the gripper 401 a regulating force which regulates at least a part of the movement of the gripper 401 in the regulated mode. This regulating force is a regulating force according to a regulating condition 20pb stored in the memory 20p, and includes the magnitude and the direction of the force which limit at least parts of the movements of the position and the posture of the gripper 401. For example, this regulating force includes the magnitude and the direction of a force for making moving amounts of the position and the posture of the gripper 401 corresponding to the movement of the position and the posture of the end effector 11 which are regulated by the regulating condition 20pb to 0 (zero). The motion controller 422 generates the control command for making each motor 404 drive so as to give to the gripper 401 the regulating force of the magnitude and the direction according to the operation regulating command, and outputs it to the motor 404. Therefore, for example, the user P operates the gripper 401, while sensing that the gripper 401 is regulated so that the gripper 401 does not carry out the movement described above. Alternatively, the regulating force may be set so that, even if the user P gives the operating force to the gripper 401 to carry out the movement described above, the gripper 401 does not carry out the movement described above.

Note that the magnitude of the regulating force of the operation regulating command may be a magnitude defined beforehand, or the motion controller 422 may adjust the regulating force corresponding to the detection value of the force sensor 405. For example, the motion controller 422 may adjust the magnitude of the regulating force to the magnitude larger than the detection value of the force sensor 405 in the regulated moving direction, corresponding to the operating force which is given to the gripper 401 by the user P.

The memory 20p of the control device 20 stores various information, and allows a read-out of the information stored therein. For example, the memory 20p stores information inputted via the input device 410 of the operation input device 40. Further, the memory 20p stores, as information used for image processing, camera parameters including external parameters and internal parameters of the camera of the imaging device 30. The example of the external parameter includes parameters indicative of the position (three-dimensional position) and the orientation (a direction of the optical axis) of the camera. The example of the internal parameter includes parameters indicative of a distortion, a focal length, a size of each pixel of an image sensor, pixel coordinates of the optical axis of a lens of the camera. The memory 20p may store the object to be ground by the robot 10, and a position, a shape, a size, etc. of the grinding target area of the object in association with each other. Alternatively, the memory 20p may store the image data captured by the imaging device 30, processed image data of the image data, and/or the program. The memory 20p stores posture information 20pa, the regulating condition 20pb, and avoiding information 20pc.

The regulating condition 20pb is information for regulating at least parts of the movements of the position and the posture of the end effector 11. In detail, the regulating condition 20pb includes information for limiting the movement of the end effector 11 so that the end effector 11 does not move in at least one of the moving direction of the position and the moving direction of the posture. In this embodiment, although the regulating condition 20pb regulates only the movement of the posture of the end effector 11, the regulating condition 20pb may regulate only the movement of the position, or may regulate both the movements of the position and the posture. The regulating condition 20pb may be information for adding a restriction to the manipulational position command of the manipulation command of the operation control device 420, or may be information for adding a restriction to a position command of the operational command of the end effector 11 generated by the first operational commander 20d based on the manipulation command.

Here, the operational command of the end effector 11 includes at least the position command among the position command and the force command, and, in this embodiment, it includes both commands. The position command indicates the position of the end effector 11. The force command indicates a force which the end effector 11 applies to the object. The position command may include a command of a three-dimensional position and a three-dimensional posture of the end effector 11. Further, the position command may include an execution time of the command of the three-dimensional position and the three-dimensional posture. The force command may include a command of the magnitude of the force and the direction of the force. Further, the force command may include an execution time of the command of the magnitude and the direction of the force. In this specification and the claims, the "force" may include at least the magnitude of the force among the magnitude and the direction of the force, and the "position" may include at least the three-dimensional position among the three-dimensional position and the three-dimensional posture.

The three-dimensional position and the three-dimensional posture are the position and the posture in a three-dimensional space. The three-dimensional position and the three-dimensional posture may be defined using a world coordinate system, a robot coordinate system, etc. The world coordinate system is a coordinate system set in a space where the robot 10 is disposed. The robot coordinate system is a coordinate system on the basis of the robot 10, and, for example, it may be a coordinate system on the basis of the pedestal 13 on which the robotic arm 12 is installed. In this embodiment, since the robotic arm 12 is fixed, the world coordinate system and the robot coordinate system are considered to be the same.

For example, the regulating condition 20pb which regulates the movement of the posture of the end effector 11 may include information for limiting commands of a displacement of the posture, a moving speed, etc. included in the manipulational position command and the position command. For example, the regulating condition 20pb may include information for limiting a rotation displacement, a rotational speed, etc. about the three axes corresponding to the moments of forces about the three axes of the force sensors 11e and 405 to a limiting value, such as 0 (zero). Although not limited to this configuration, in this embodiment, the regulating condition 20pb limits the rotation displacement, the rotational speed, etc. about each of the Xe-axis and the Ye-axis of the force sensor 11e, or the rotation displacement, the rotational speed, etc. about each of the Xe-axis, the Ye-axis, and the Ze-axis. Alternatively, the regulating condition 20pb limits the rotation displacement, the rotational speed, etc. about each of the Xc-axis and the Yc-axis of the force sensor 405, or the rotation displacement, the rotational speed, etc. about each axes of the Xc-axis, the Yc-axis, and the Zc-axis.

For example, the rotational movements about the Xe-axis and the Xc-axis correspond to the movements of the end effector 11 and the gripper 401 in the pitching direction, respectively. The rotational movements about the Ye-axis and the Yc-axis correspond to the movements of the end effector 11 and the gripper 401 in the rolling direction, respectively. The rotational movements about the Ze-axis and the Zc-axis correspond to the movements of the end effector 11 and the gripper 401 in the yawing direction.

For example, the regulating condition 20pb which regulates the movement of the position of the end effector 11 may include information for limiting the command of the displacement, the moving speed, etc. of the position included in the manipulational position command and the position command. For example, the regulating condition 20pb may include information for limiting the displacement, the moving speed, etc. of the position in the three axial directions corresponding to the forces in the three axial directions of the force sensors 11e and 405 to a limiting value, such as 0. For example, when the movement of the position of the end effector 11 in a direction perpendicular to the moving direction of the end effector 11 is regulated, the regulating condition 20pb may include information for limiting component in the direction perpendicular to the moving direction, of the displacement, the moving speed, etc. of the position in the three axial directions, to a limiting value, such as 0. Note that the moving direction of the end effector 11 may be a direction in which the end effector 11 is moved during the grinding operation, such as a direction of an approximated straight line of the locus of the end effector 11, and a direction of a tangent of the locus of the end effector 11.

The posture information 20pa is information on the given posture set to the end effector 11. The control device 20 changes the posture of the end effector 11 into the given posture corresponding to the transition command inputted into the operation input device 40. In this embodiment, the given posture is set as a basic posture which is the fundamental posture of the end effector 11 during a grinding operation. Below, the given posture may also be expressed as the basic posture. The basic posture is also a desirable posture of the end effector 11 during a grinding operation. The basic posture may be set as a posture with respect to the robot 10 and a posture with respect to the surface of the grinding target area WA. In this embodiment, the basic posture is set as the posture with respect to the surface of the grinding target area WA.

The avoiding information 20pc is information for moving the position of the end effector 11, when a trouble arises in the transition of the posture of the end effector 11 according to the transition command. For example, the trouble described above may be that the end effector 11 is unable to change its posture to the basic posture, when the end effector 11 contacts or collides with another object. The trouble described above is detected by the control device 20 based on the detection value of the force sensor 11e during the transition. The avoiding information 20pc may be information for commanding the movement of the position by a given distance in a direction other than the opposite direction from the direction of the reaction force detected by the force sensor 11e. Alternatively, the avoiding information 20pc may be information for commanding the movement of the position in a direction (for example, the Ze-axis negative direction) and by a distance which are defined beforehand.

The imaging controller 20a controls the operation of the imaging device 30 to acquire the image data captured by the imaging device 30. The imaging controller 20a associates with each other two image data captured at the same time by the imaging device including the stereo camera, and outputs them to the image processors 20b and 20c etc. Capturing the image by the imaging device 30, and acquiring the image data captured by the imaging device 30 include acquiring one still image data captured by the imaging device 30, and acquiring still image data of one frame from video data captured by the imaging device 30.

The first image processor 20b processes the image data acquired from the imaging controller 20a to detect the three-dimensional position of each position of the photographic subject projected onto the image data, and generate the three-dimensional image data which is the image data indicative of the three-dimensional position of each position. In detail, the first image processor 20b identifies the grinding target area WA projected onto each of the two image data captured at the same time by the imaging device 30. For example, the first image processor 20b may compare it by a pattern matching technique etc. with the shape of the grinding target area WA stored in the memory 20p to extract an edge of the grinding target area WA in each image data. Further, the first image processor 20b performs image processing by a stereo matching technique etc. using the camera parameters stored in the memory 20p to detect a distance between a photographic subject projected to at least three pixels and the imaging device 30, within the grinding target area WA of at least one of the two image data. Further, the first image processor 20b detects a three-dimensional position in the three-dimensional space where the robot system 1 exists, for the photographic subject projected onto each pixel from which the distance is detected.

Further, the first image processor 20b uses the three-dimensional positions of at least three pixels of the grinding target area WA to detect a plane which the three-dimensional positions form in the three-dimensional space, as the surface of the grinding target area WA. Note that the method of detecting the plane described above may be any kind of known method. For example, the first image processor 20b may detect a plane passing through the three-dimensional positions of the at least three pixels as the surface of the grinding target area WA. Alternatively, the first image processor 20b may detect a plane passing through the three-dimensional positions of the at least three pixels or their vicinities (i.e., a plane which approximates the at least three three-dimensional positions) as the surface of the grinding target area WA. Alternatively, the first image processor 20b may detect a curved surface passing through the three-dimensional positions of the at least three pixels, and may detect a plane which is perpendicular to the normal of the curved surface and has an intersection with the curved surface, as the surface of the grinding target area WA. The first image processor 20b outputs information on the three-dimensional position and the three-dimensional posture of the surface of the grinding target area WA to the posture determinator 20h, the memory 20p, etc.

The second image processor 20c outputs the image data acquired from the imaging controller 20a and displays it on the presentation device 50. The 20 second image processor 20c may acquire the processed image data from the first image processor 20b, and may output the image data indicative of the three-dimensional shape of the grinding target area WA to the presentation device 50. For example, the image data described above may be a distance image of which a pixel value of each pixel is a distance value from the imaging device 30 to the photographic subject. The distance value may be expressed by the shade or color of the pixel.

The posture determinator 20h determines the basic posture, to which the posture of the end effector 11 is changed, corresponding to the transition command of the posture inputted into the operation input device 40. When the transition command of the posture of the end effector 11 is received from the operation input device 40, the posture determinator 20h requests the first image processor 20b for information on the surface of the grinding target area WA. The first image processor 20b requests the imaging controller 20a for imaging the grinding target area WA, and carries out image processing of the image data received from the imaging controller 20a to detect the information on the three-dimensional position and the three-dimensional posture of the surface of the grinding target area WA, and outputs it to the posture determinator 20h. The posture determinator 20h reads the posture information 20pa from the memory 20p, and detects the information on the basic posture of the end effector 11 with respect to the surface of the grinding target area WA, using the posture information 20pa and the information on the surface of the grinding target area WA. The posture determinator 20h outputs to the first operational commander 20d the information on the basic posture, such as the attitude angle about each coordinate axis. The posture determinator 20h is one example of an accepting part.

Note that, when the posture information 20pa includes the information on the basic posture with respect to the robot 10, not the information on the basic posture with respect to the surface of the grinding target area WA, the posture determinator 20h determines the information on the basic posture included in the posture information 20pa as the information on the basic posture of the end effector 11.

The first operational commander 20d generates the operational command for making the end effector 11 carry out a target operation, and outputs it to the motion controller 20f. The operational command may include a command for operating the grinding device 11a. The first operational commander 20d is one example of a first commander.

For example, the first operational commander 20d generates an operational command for making the end effector 11 carry out operation corresponding to the manipulation command received from the operation input device 40. Further, in the regulated mode, the first operational commander 20d applies the regulating condition 20pb in the memory 20p to the operational command, and generates an operational command reflecting the regulating condition. The first operational commander 20d may output the operational command reflecting the regulating condition and/or the regulating condition 20pb to the second operational commander 20e. The first operational commander 20d generates an operational command for moving the posture of the end effector 11 to the basic posture according to the transition command received from the operation input device 40. The first operational commander 20d generates an operational command for moving the position of the end effector 11 along an avoiding course received from the avoiding course determinator 20j.

For example, in the non-regulated mode, the first operational commander 20d converts the manipulational position command and the manipulational force command which are included in the manipulation command into the position command and the force command in the robot coordinate system to generate the operational command including the position command and the force command. In the regulated mode, the first operational commander 20d may process the manipulational position command by applying the regulating condition 20pb, may generate and output the operational command by using the processed manipulational position command and manipulational force command. Alternatively, the first operational commander 20d may generate the operational command by using the manipulational position command and the manipulational force command, may process the operational command by applying the regulating condition 20pb, and may output the processed operational command.

The motion controller 20f generates a control command for operating each part of the robot 10 according to the operational command received from the first operational commander 20d, and outputs it to the robot 10. The motion controller 20f acquires information on the operating state of each part of the robot 10 from the operational information processor 20g, and generates a control command by using this information as feedback information. In detail, the motion controller 20f generates the control command for operating servomotors Ma of the arm drives M1, M2, M3, M4, M5, and M6 of the robotic arm 12, and a motor (not illustrated) of the grinding device 11a of the end effector 11.

The operational information processor 20g detects and processes operational information of the robot 10. The operational information processor 20g detects an ON state and an OFF state of the grinding device 11a as the operational information based on a power-supplying state etc. of the grinding device 11a. The operational information processor 20g acquires a detection value of a rotation sensor Mb of the servomotor Ma of each of the arm drives M1, M2, M3, M4, M5, and M6, a detection value of a current sensor Mc of the servomotor Ma, and a detection value of the force sensor 11e of the end effector 11, as the operational information. Note that the operational information processor 20g may acquire a command value of current which the drive circuit of the servomotor Ma supplies to this servomotor Ma, as the operational information. The operational information processor 20g outputs the operational information described above to the motion controller 20f and the second operational commander 20e as the feedback information. For example, in the operational information, the detection values of the rotation sensors Mb of the servomotors Ma of the arm drives M1, M2, M3, M4, M5, and M6, and the detection values of the current sensor Mc of the servomotor Ma are position data indicative of the displacement and the displacement speed of the position and the posture of the end effector 11, and the detection value of the force sensor 11e is force data indicative of the magnitude and the direction of the reaction force received at the end effector 11.

The second operational commander 20e generates a motor operational command which is an operational command for giving a force to the gripper 401 of the user interface 400, and for moving the position and the posture of the gripper 401, and outputs it to the operation input device 40. The motor operational command includes the operation driving command and/or the operation regulating command. The second operational commander 20e is one example of a second commander.

For example, the second operational commander 20e generates a motor operational command including the operation driving command for giving to the gripper 401 the reaction force corresponding to the magnitude and the direction of the force which are detected by the force sensor 11e, based on the force data of the operational information received from the operational information processor 20g.

Further, the second operational commander 20e uses the position data of the operational information received from the operational information processor 20g, and the position data of the operational information of the gripper 401 received from the operation input device 40 to generate a motor operational command including the operation driving command for moving the gripper 401 so that the position and the posture of the gripper 401 correspond to the position and the posture of the end effector 11. The operation driving command may include at least one of the position command and the force command for the gripper 401. Thus, the motor 404 of the user interface 400 can move the gripper 401 so that the position and the posture of the end effector 11 which operates without being regulated in the non-regulated mode, the position and the posture of the end effector 11 which operates while being regulated in the regulated mode, the position and the posture of the end effector 11 which operates in accordance with the transition command, and the position and the posture of the end effector 11 which operates along the avoiding course correspond to the position and the posture of the gripper 401.

For example, in the operational information of the gripper 401, the detection value of the rotation sensor (not illustrated) of the motor 404 is position data indicative of displacements and displacement speeds of the position and the posture of the gripper 401, and the detection value of the force sensor 405 is force data indicative of the magnitude and the direction of the force which acts on the gripper 401.

Further, the second operational commander 20e generates, in the regulated mode, the motor operational command including the operation regulating command for giving to the gripper 401 a force resisting (against) the input of the force into the gripper 401 which commands the movement of the end effector 11 in the direction limited by the regulating condition 20pb. For example, the resisting force described above may include a magnitude and a direction of a force for making the moving amounts of the position and the posture of the gripper 401 corresponding to the movement of the position and posture of the end effector 11 which are regulated by the regulating condition 20pb to 0 (zero). The operation regulating command may include at least one of the position command and the force command for the gripper 401.

The second operational commander 20e may generate the motor operational command using the detection value of the force sensor 405 received from the operation input device 40 and the regulating condition 20pb and/or the operational command reflecting the regulating condition 20pb. Therefore, the motor 404 of the user interface 400 can give to the gripper 401 the force for preventing the movement of the gripper 401 in the direction limited by the regulating condition 20pb. According to this, the position and the posture of the end effector 11 which operates according to the regulating condition 20pb, and the position and the posture of the gripper 401 present similar behaviors.

The avoidance determinator 20i determines whether an avoidance to move the position of the end effector 11 is required during the transition of the end effector 11 to the basic posture, and outputs the determination result to the avoiding course determinator 20j. During the transition of the end effector 11 to the basic posture, the avoidance determinator 20i determines that avoidance is required, if the force sensor 11e detects the input of the force which is larger than a threshold (i.e., a threshold-exceeding force). In this case, the avoidance determinator 20i outputs to the avoiding course determinator 20j the command for performing the avoidance and the direction of the threshold-exceeding force detected by the force sensor 11e. The threshold may be set corresponding to various conditions, such as the work environment of the robot system 1, the detecting sensitivity of the demanded force, and the type of the object, and, for example, it may be set as a value equal to or larger than zero. For example, the threshold may be the magnitude of the force which impedes the transition of the end effector 11 to the basic posture. For example, the threshold may be the magnitude of the force indicative of a contact of the end effector 11 with the object.

The avoiding course determinator 20j determines the avoiding course for the avoidance of the end effector 11, and outputs it to the first operational commander 20d. In detail, when an execution command for avoidance is received from the avoidance determinator 20i, the avoiding course determinator 20j reads the avoiding information 20pc from the memory 20p. Further, the avoiding course determinator 20j applies the direction of the force received from the avoidance determinator 20i to the avoiding information 20pc to determine the avoiding course including the moving direction and the moving distance of the position of the end effector 11 for avoiding the input of the force.

[Operation of Robot System]
[Operation of Robot by Manipulation of Operation Input Device in Non-Regulated Mode]

Operation of the robot 10 by manipulation of the user interface 400 of the operation input device 40 in the non-regulated mode is described. As illustrated in FIGS. 1, 4 and 6, for example, the user P grips the handles 401a and 401b of the gripper 401 and moves and changes the posture of the gripper 401 in the moving direction to a target position of the grinding device 11a of the end effector 11, and in the rotating direction to a target posture. Further, the user P gives an input to the input part 401c of the gripper 401 to start the grinding device 11a.

The support 402 moves and changes the posture together with the gripper 401, and causes each of the six arms 403 to perform operation, such as bending and changing the posture to rotate the rotation shaft of the motor 404 connected to the arm 403. The operation control device 420 outputs, to the control device 20, the manipulation command based on the rotation signal of the rotation sensor of the motor 404 and the force signal of the force sensor 405.

The control device 20 generates the operational command based on the manipulation command, and causes the robot 10 to operate according to the operational command. The control device 20 operates the robotic arm 12 so that the change in the position and the change in the posture of the end effector 11, and the applied force to the object W through the grinding device 11a reflect the force signal described above. Therefore, the user P can operate the gripper 401 of the user interface 400 to cause the robot 10 to perform operation as he/she intended.

Further, the control device 20 causes each motor 404 to generate the load torque corresponding to the reaction force, in order to give to the gripper 401 the reaction force corresponding to the force data based on the detection signal of the force sensor 11e of the end effector 11. Therefore, for example, the user P can operate the position and the posture of the gripper 401, while sensing the reaction force from the gripper 401 as if he/she receives the reaction force from the object W.

The reaction force of the gripper 401 reflects the magnitude and the direction of the force which are detected by the force sensor 11e. Such a reaction force of the gripper 401 can make the hands of the user P sense the state of the grinding device 11a during operation which varies depending on the surface state of the object. For example, the reaction force of the gripper 401 can make the hands of the user P feel the tactile sense which should be received by the hands of the user P when the user P performs grinding with his/her hands holding the grinding device 11a.

The commands of the amount of change in the position, the amount of change in the posture, and the magnitude of the action force of the end effector 11 are increased proportionally to the commands of the amount of change in the position, the amount of change in the posture, and the magnitude of the force which are indicated by the force signal of the force sensor 405. Therefore, the robotic arm 12 can change the position and the posture of the end effector 11 greatly beyond the operational range of the gripper 401. Further, the end effector 11 can generate the action force greatly beyond the force applied to the gripper 401.

[Operation in Regulated Mode]

Figure 8:
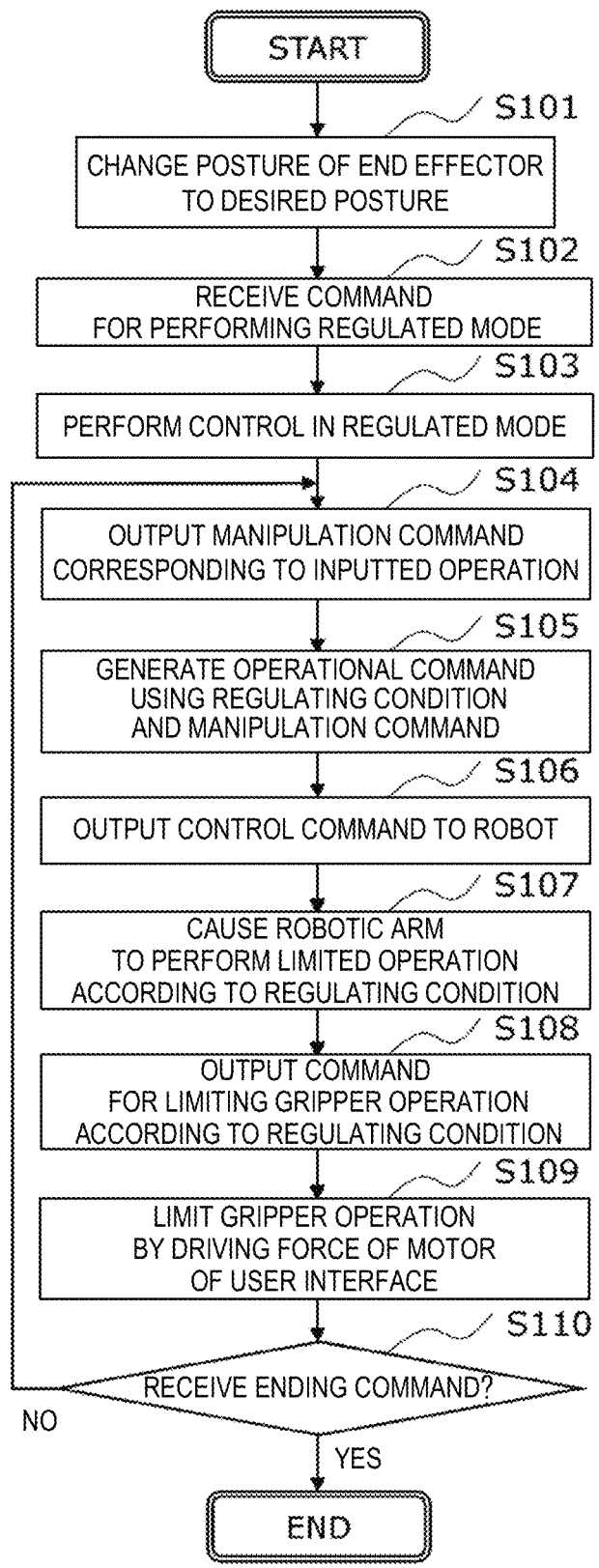
FIG. 8 is a flowchart illustrating one example of operation in a regulated mode of the robot system according to this embodiment.

One example of operation of the robot system 1 in the regulated mode is described. In this example, in the regulated mode, the rotation displacement about each of the Xe-axis, the Ye-axis, and the Ze-axis of the end effector 11 is limited, and the rotation displacement about each of the Xc-axis, the Yc-axis, and the Zc-axis of the gripper 401 of the user interface 400 is limited. FIG. 8 is a flowchart illustrating one example of the operation of the robot system 1 according to this embodiment in the regulated mode.

As illustrated in FIG. 8, at Step S101, the user P operates the user interface 400 to change the posture of the grindstone 11b of the grinding device 11a of the end effector 11 to the desired posture with respect to the surface of the grinding target area WA. The transition to the desired posture by the user P may be before or during the grinding operation. The transition to the desired posture may be a transition to the basic posture according to the transition command. Note that, when the posture of the grindstone 11b is already the desired posture, the processing of this step may be omitted.

Next, at Step S102, the user P inputs into the input device 410 of the operation input device 40 the command for performing the regulated mode, and the operation control device 420 of the operation input device 40 accepts this command and outputs it to the control device 20.

Next, at Step S103, the control device 20 starts and performs the control in the regulated mode. In detail, the control device 20 performs the control to limit the rotation displacement of the end effector 11 about each of the Xe-axis, the Ye-axis, and the Ze-axis with respect to a first posture setting which is the current posture of the end effector 11, and to limit the rotation displacement of the gripper 401 about each of the Xc-axis, the Yc-axis, and the Zc-axis with respect to a second posture setting which is the current posture of the gripper 401.

Next, at Step S104, when the operation is inputted into the gripper 401 of the user interface 400 by the user P, the operation control device 420 generates the manipulation command based on the force signal of the force sensor 405 corresponding to the inputted operation, and outputs it to the control device 20.

Next, at Step S105, the control device 20 uses the regulating condition 20pb in the memory 20p and the manipulation command to issue the operational command reflecting the regulating condition 20pb. For example, the control device 20 performs processing for making the command value corresponding to the moment about each of the Xc-axis, the Yc-axis, and the Zc-axis to 0 in the manipulation command, or it performs processing for making the command value corresponding to the moment about each of the Xe-axis, the Ye-axis, and the Ze-axis to 0 in the operational command generated using the manipulation command.

Next, at Step S106, the control device 20 generates a control command for operating each part of the robot 10 according to the operational command, and outputs it to the robot 10. Next, at Step S107, the robotic arm 12 moves the position of the end effector 11 according to the manipulation command, while limiting the change in the posture of the end effector 11 from the first posture setting. That is, the robotic arm 12 performs the operation which is limited according to the regulating condition 20pb.

Further, at Step S108, the control device 20 generates a motor operational command for giving to the gripper 401 a moment against the detection value of the moment about each axis of the force sensor 405 based on the regulating condition 20pb and the detection value of the force sensor 405, and outputs it to the operation input device 40. The motor operational command is a command for making the motor 404 of the operation input device 40 drive so as to give to the gripper 401 the moment for canceling out the moment about each axis inputted into the gripper 401 by the user P. That is, the control device 20 outputs the motor operational command for limiting the operation of the gripper 401 according to the regulating condition 20pb.

Next, at Step S109, the operation control device 420 gives the force to the gripper 401 by making each motor 404 drive according to the motor operational command to limit the rotation displacement of the gripper 401 about each axis of the force sensor 405. That is, the operation control device 420 limits the operation of the gripper 401 by the driving force of each motor 404.

Next, at Step S110, the control device 20 determines whether it received a command for ending the regulated mode via the input device 410, and if received (Yes at Step S110), it ends the series of processings, and if not received (No at Step S110), it returns to Step S104.

By the processing of Steps S101-S110, the control device 20 operates the end effector 11 according to the operation inputted into the gripper 401, while maintaining the posture of the end effector 11 and the posture of the gripper 401 to be the same required posture.

[Shift Operation to Basic Posture of End Effector]

Figure 9:
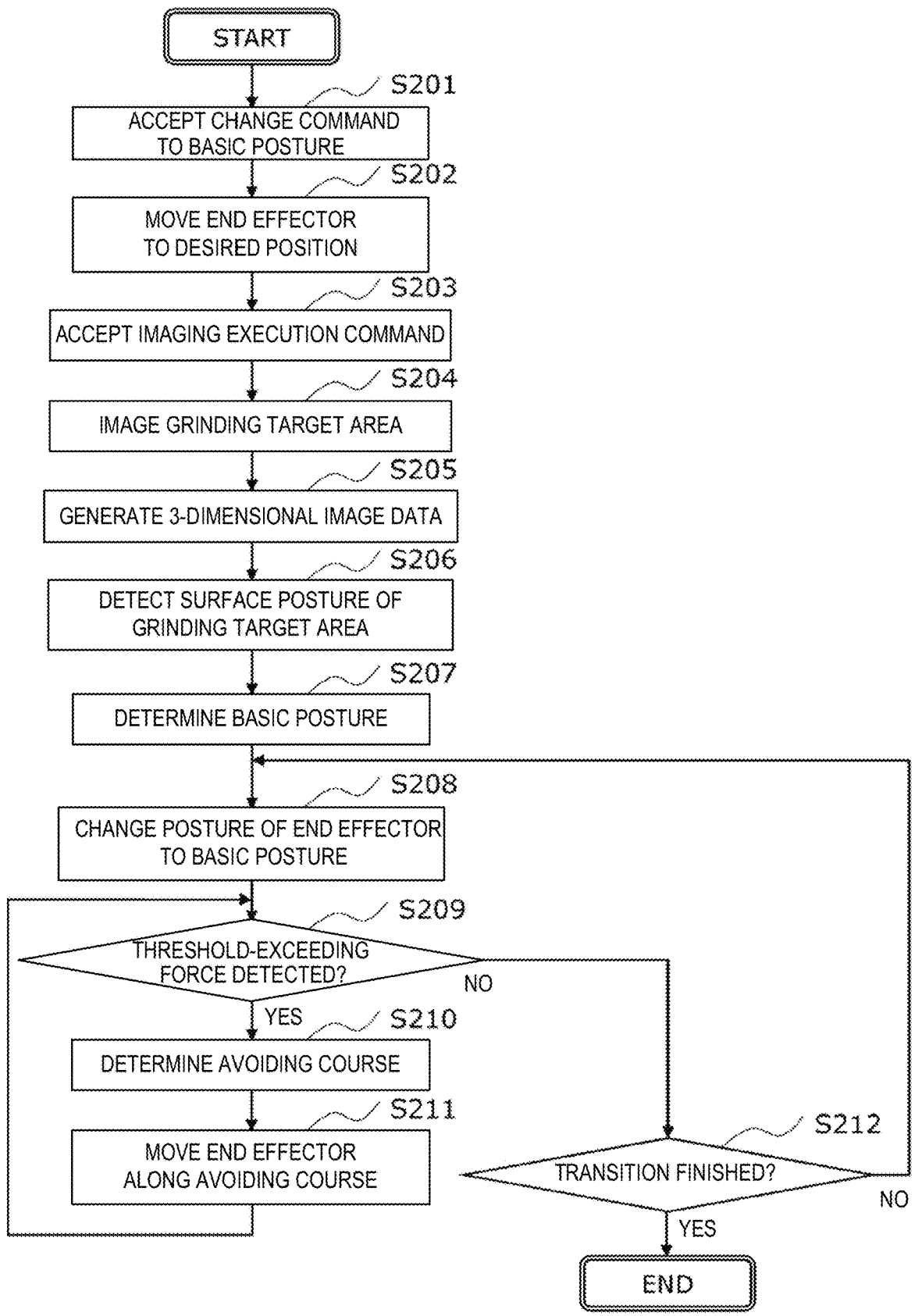
FIG. 9 is a flowchart illustrating one example of operation for changing the posture of the end effector of the robot system according to this embodiment to a basic posture.

One example of operation which changes the posture of the end effector 11 in the robot system 1 into the basic posture is described. FIG. 9 is a flowchart illustrating one example of the operation for changing the end effector 11 of the robot system 1 according to this embodiment into the basic posture.

As illustrated in FIG. 9, at Step S201, the user P inputs into the input device 410 of the operation input device 40 a command for changing the posture of the end effector 11 to the basic posture, and the operation control device 420 accepts this command and outputs it to the control device 20.

Next, at Step S202, the user P operates the user interface 400 to move the end effector 11 to a desired position with respect to the grinding target area WA. Note that, when the position of the end effector 11 is already at the desired position, the processing of this step may be omitted.

Next, at Step S203, the user P inputs the command for the imaging execution into the input device 410, and the operation control device 420 accepts this command and outputs it to the control device 20.

Next, at Step S204, the control device 20 makes the imaging device 30 image the grinding target area WA. Next, at Step S205, the control device 20 processes the image data of the grinding target area WA to generate the three-dimensional image data of the image data. Next, at Step S206, the control device 20 detects the posture of the surface of the grinding target area WA by using the three-dimensional image data. Next, at Step S207, the control device 20 determines the basic posture of the end effector 11 by using the posture information 20pa in the memory 20p and the information on the posture of the surface of the grinding target area WA.

Next, at Step S208, the control device 20 operates the robotic arm 12 so as to change the posture of the end effector 11 to the basic posture. That is, the control device 20 performs the transition to the basic posture.

Figure 10:
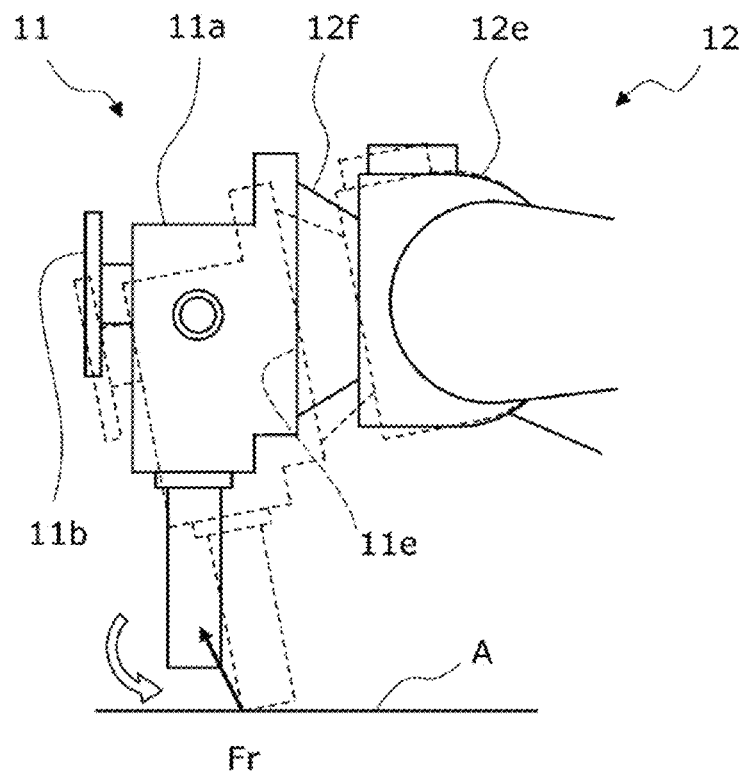
FIG. 10 is a side view illustrating one example of occurrence of a trouble in the transition during the transition of the end effector to the basic posture.

Next, at Step S209, the control device 20 determines whether the threshold-exceeding force is detected by the force sensor lie, and if detected (Yes at Step S209), the flow proceeds to Step S210, and if not detected (No at Step S209), the flow proceeds to Step S212. For example, as illustrated in FIG. 10, when the threshold-exceeding force is detected, the trouble in the transition may have occurred by the end effector 11 contacting or colliding another object A. FIG. 10 is a side view illustrating one example of the occurrence of the trouble in the transition during the transition of the end effector 11 to the basic posture. In FIG. 10, while the posture of the end effector 11 in which the grindstone 11b which is parallel to the vertical plane as illustrated by solid lines is changed to the basic posture in which the grindstone 11b inclines obliquely to the vertical plane, the end effector 11 collides the object A as illustrated by broken lines.

At Step S210, the control device 20 suspends the transition of the posture, and then determines the avoiding course of the end effector 11 by using the avoiding information in the memory 20p and the direction of the threshold-exceeding force detected by the force sensor lie. In this example, the avoiding course is a course in a direction of the threshold-exceeding force by a given distance. In FIG. 10, the avoiding course is a course in a direction of a threshold-exceeding force Fr detected by the force sensor 11e by the given distance.

Figure 11:
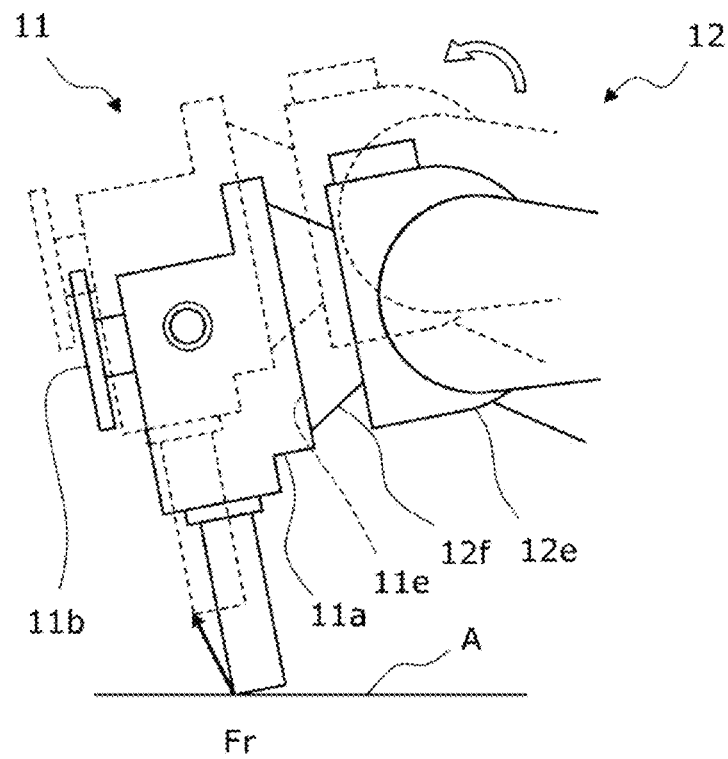
FIG. 11 is a side view illustrating one example of an avoidance operation during the transition of the end effector to the basic posture.

Next, at Step S211, the control device 20 operates the robotic arm 12 so that the end effector 11 moves along the avoiding course, and the flow proceeds to Step S209. That is, the control device 20 performs the avoidance of the end effector 11. For example, as illustrated in FIG. 11, the control device 20 moves the end effector 11 in the direction of the force Fr by the given distance. FIG. 11 is a side view illustrating one example of the avoidance operation during the transition of the end effector 11 to the basic posture. In FIG. 11, the end effector 11 which is suspended in the state of FIG. 10 illustrated by solid lines is moved along the avoiding course as illustrated by broken lines.

At Step S212, the control device 20 determines whether the transition to the basic posture is finished, and if finished (Yes at Step S212), it ends the series of processings, and if not finished (No at Step S212), it returns to Step S208. For example, in FIG. 11, after the completion of the avoidance at Step S211, since the transition to the basic posture has not been finished, the processing of the transition to the basic posture at and after Step S208 is repeated.

By the processing of Steps S201-S212, the control device 20 can change the posture of the end effector 11 to the basic posture corresponding to the occurrence of trouble, such as the contact and the collision with another object. Further, when the threshold-exceeding force is detected by the force sensor lie during the movement of the end effector 11 along the avoiding course, the control device 20 can again set the avoiding course corresponding to the direction of the force. Further, by detecting the posture of the surface of the grinding target area WA, the control device 20 enables the transition to the basic posture corresponding to various postures of the surface of the grinding target area WA.

Note that, in the processing of Steps S201-S212, the control device 20 independently performs the movement of the end effector 11 along the avoiding course, and the transition of the posture of the end effector 11 to the basic posture. In detail, the control device 20 resumes the transition of the posture of the end effector 11 to the basic posture, after the completion of the movement of the end effector 11 along the avoiding course. However, the avoiding operation of the end effector 11 is not limited to the above. For example, during the movement of the end effector 11 along the avoiding course, the control device 20 may resume the transition of the posture of the end effector 11 to the basic posture, to perform the two operations in parallel. Alternatively, the control device 20 may simultaneously start the movement of the end effector 11 along the avoiding course, and the resumption of the transition of the posture of the end effector 11 to the basic posture, to perform the two operations in parallel. Further, when the threshold-exceeding force is detected by the force sensor 11e during the parallel operation, the control device 20 may again set the avoiding course corresponding to the direction of the force.

OTHER EMBODIMENTS

As described above, although examples of the embodiment of the present disclosure are described, the present disclosure is not limited to the above embodiment. That is, various modifications and improvements are possible within the scope of the present disclosure. For example, those obtained by variously modifying the embodiment, and those constructed by combining the components in different embodiments are also encompassed within the scope of the present disclosure.

For example, in this embodiment, although the control device 20 detects the posture of the surface of the grinding target area WA for determining the basic posture by processing the image captured by the imaging device 30, it is not limited to this configuration. The posture of the surface described above is detectable using a device which can detect a distance to the object. For example, such a device may be a sensor which detects the distance using light wave, laser, or ultrasonic wave.

Although in the above embodiment the robot 10 which is the industrial robot is illustrated as a mechanical apparatus to which the technology of the present disclosure is applicable, the mechanical apparatus to which the technology of the present disclosure is applicable may be mechanical apparatuses other than the industrial robot. For example, the mechanical apparatus may be a service robot, construction machinery, a tunnel boring machine, a crane, a cargo conveyance vehicle, and a humanoid. The service robot is a robot used in various service industries, such as nursing, medical science, cleaning, security, information service, rescue, cooking, and goods offering.

Further, the technique of the present disclosure may be a controlling method. For example, a controlling method according to one aspect of the present disclosure is the controlling method for controlling the slave unit which is operated by the master unit. The controlling method includes outputting, according to the operational information which is information inputted by the force being applied to the operation end of the master unit, and the regulating condition which regulates a given movement of the action part which applies an action to an object in the slave unit, the command for causing an operation part of the slave unit to operate the action part to carry out the operation reflecting the regulating condition. The controlling method also includes outputting, according to the regulating condition, a command for causing the master unit to generate the force to the operation end against the input to the operation end which commands the given movement of the action part. This controlling method may be implemented by a circuit such as a CPU and an LSI, an IC card, or a sole module.

Further, the technique of the present disclosure may be a program for performing the controlling method described above, or may be a non-transitory computer readable recording medium on which the program is recorded. It is needless to say that the program described above may be distributed via a transmission medium, such as the Internet.

Note that all the numbers used above, such as the order and the quantity are illustrated in order to concretely explain the technique of the present disclosure, and the present disclosure is not limited to the illustrated numbers. Further, the connection relationships between the components are illustrated in order to concretely explain the technique of the present disclosure, and the connection relationship which realizes the functions of the present disclosure is not limited to those relationships.

The division of a block in the functional block diagram is one example, and therefore, a plurality of blocks may be realized as one block, one block may be divided into a plurality of blocks, and/or a part of the function may be moved to other blocks. Further, functions of a plurality of blocks which have similar functions may be processed in parallel or in a time-divided manner by sole hardware or software.

The invention claimed is:

1. A master-slave system, comprising:
a master including:
an operation end which is operable by a user,
an operation detector that detects and outputs operational information that is information according to a first force applied to the operation end, and
a force applier that applies a second force to the operation end;
a slave including an actuator that applies an action to an object, wherein a robot moves the actuator;
a memory which stores a regulating condition which regulates at least (1) a movement, a position and a posture of the operation end, and (2) a position, a direction and a posture of the actuator; and
control circuitry, including:
first circuitry that generates a first command, according to the operational information, for the robot to operate the actuator to carry out an operation with movement of the actuator limited by the regulating condition, and outputs the first command to the robot; and
second circuitry that outputs, according to the regulating condition, a second command to control the force applier to apply the second force to the operation end against the first force applied to the operation end so as to restrict movement of the operation end which commands would otherwise command the movement of the actuator that is limited by the regulating condition.

2. The master-slave system of claim 1, wherein
the slave moves the position and the posture of the actuator according to an instruction from the robot, and
the operation end is movable to change the position and the posture of the operation end.

3. The master-slave system of claim 1, wherein the operation detector detects a direction and a magnitude of the first force applied to the operation end, as the operational information.

4. The master-slave system of claim 3, wherein the operation detector detects magnitudes of forces in directions of three axes and moments of the forces about the three axes, that are applied to the operation end, as the operational information.

5. The master-slave system of claim 4, wherein the regulating condition regulates a movement of the posture of the actuator corresponding to the moments of the forces about the three axes of the operational information.

6. The master-slave system of claim 1, wherein
the actuator includes a grinding device, and
the robot includes a robotic arm.

7. The master-slave system of claim 6, wherein the regulating condition maintains a posture of the grinding device relative to a surface of the object.

8. The master-slave system of claim 1, wherein
the control circuitry further accepts a transition command for changing the posture of the actuator to a particular posture, and
when the control circuitry accepts the transition command, the first circuitry outputs a command for changing the posture of the actuator into the particular posture.

9. The master-slave system of claim 8, wherein
the force applier is connected to the operation end to move the operation end by the second force applied by the force applier, and
when the control circuitry accepts the transition command, the second circuitry further outputs a command to control the force applier to apply, to the operation end, a force that changes the posture of the operation end into a posture corresponding to the particular posture.

10. The master-slave system of claim 8, wherein
the slave further includes a force detector that detects a force received by the actuator from the object, and
when the force detector detects the first force during a transition of the actuator to the particular posture, the first circuitry outputs a command for moving the position of the actuator and changing the posture of the actuator into the particular posture.

11. The master-slave system of claim 9, wherein
the slave further includes a slave force detector that detects a force received by the actuator from the object, and
when the slave force detector detects the force received during a transition of the actuator to the particular posture, the first circuitry outputs the first command for the robot to move the position of the actuator and change the posture of the actuator into the particular posture.

12. The master-slave system of claim 1, wherein the control circuitry is configured to switch between a regulated mode, in which the regulating condition is applied to limit the movement of the actuator, and a non-regulated mode, in which the regulating condition is not applied.

13. The master-slave system of claim 12, wherein the control circuitry is configured to switch from the non-regulated mode to the regulated mode in response to a command received from the user.

14. The master-slave system of claim 1, wherein the regulating condition limits a change in the posture of the actuator while permitting the robot to move the position of the actuator according to the operational information.

15. The master-slave system of claim 1, wherein
the operational information includes moments of the first force about three axes,
the regulating condition limits rotation of the actuator corresponding to the moments, and
the second command generates a counter-moment at the operation end that opposes a moment applied by the user.

16. The master-slave system of claim 1, wherein the control circuitry is configured to
accept a transition command from the user, and
in response to the transition command, generate a command to automatically change the posture of the actuator to a basic posture.

17. The master-slave system of claim 16, further comprising an imaging device, wherein
the control circuitry is configured to determine the basic posture based on a detected three-dimensional posture of a surface of the object captured by the imaging device.

18. The master-slave system of claim 16, wherein
the slave further includes a force detector that detects a force received by the actuator, and
when the force detector detects a force exceeding a threshold during the automatic change of the posture of the actuator, the first circuitry commands the robot to move the position of the actuator along a path an avoiding path to avoid the force.

19. The master-slave system of claim 1, wherein
the operation end is a gripper, and
the second command causes the force applier to generate a driving force that limits rotation of the gripper about at least one axis.

20. A method of controlling a slave manipulated by a master, the method comprising:
storing, in a memory, a regulating condition which regulates at least (1) a movement, a position and a posture of an operation end of the master, and (2) a position, a direction and a posture of an actuator of the slave;
generating, by control circuitry according to operational information, a first command for a robot to operate the actuator to carry out an operation with movement of the actuator limited by the regulating condition, wherein
the master includes the operation end which is operable by a user, an operation detector that detects and outputs the operational information that is information according to a first force applied to the operation end, and a force applier that applies a second force to the operation end,
the slave includes the actuator that applies an action to an object, and
the robot moves the actuator;
outputting the first command to the robot; and
outputting, according to the regulating condition, a second command to control the force applier to apply the second force to the operation end against the first force applied to the operation end so as to restrict movement of the operation end which would otherwise command the movement of the actuator that is limited by the regulating condition.

* * * * *